(12) United States Patent
Chou et al.

(10) Patent No.: US 10,579,176 B2
(45) Date of Patent: *Mar. 3, 2020

(54) SELF-CAPACITIVE TOUCH PANEL STRUCTURE, IN-CELL TOUCH PANEL, AND LIQUID CRYSTAL DISPLAY

(71) Applicants:Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Shihpo Chou, Guangdong (CN); Gui Chen, Guangdong (CN); Jingfeng Xue, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 148 days.

This patent is subject to a terminal disclaimer.

(21) Appl. No.: 15/841,332

(22) Filed: Dec. 14, 2017

(65) Prior Publication Data

US 2018/0107319 A1 Apr. 19, 2018

Related U.S. Application Data

(62) Division of application No. 14/759,268, filed on Jul. 6, 2015, now Pat. No. 9,841,832.

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/13439* (2013.01);
(Continued)

(58) Field of Classification Search
CPC ....... G06F 3/044; G06F 3/0416; G06F 3/0412
See application file for complete search history.

(56) References Cited

U.S. PATENT DOCUMENTS

| | | | |
|---|---|---|---|
| 2016/0109991 A1* | 4/2016 | Oh | G06F 3/044 345/174 |
| 2016/0252995 A1* | 9/2016 | Wang | G06F 3/0412 345/174 |
| 2016/0282976 A1* | 9/2016 | Yang | G06F 3/044 |

* cited by examiner

*Primary Examiner* — Yuzhen Shen
(74) *Attorney, Agent, or Firm* — Andrew C. Cheng

(57) ABSTRACT

A self-capacitive touch panel structure includes a touch detection chip and multiple self-capacitance electrodes arranged as a matrix and isolated with each other. Each self-capacitance electrode connected with the touch detection chip through a connection line. Each self-capacitance electrode electrically connected with a corresponding connection line through at least one via hole. A group of connection lines connected with a same column of the multiple self-capacitance electrodes are divided into an odd number group and an even number group. The connection lines in the odd number group are sequentially connected with a terminal of a corresponding self-capacitance electrode of the same column of the self-capacitance electrodes. The connection lines in the even number group are sequentially connected with a terminal of a corresponding self-capacitance electrode of the same column of the self-capacitance electrodes. An in-cell touch panel and a liquid crystal display including above structure are also disclosed.

15 Claims, 2 Drawing Sheets

(51) Int. Cl.
*G02F 1/1333* (2006.01)
*G02F 1/1343* (2006.01)
*G02F 1/1362* (2006.01)
(52) U.S. Cl.
CPC .. *G02F 1/134336* (2013.01); *G02F 1/136286* (2013.01); *G06F 3/044* (2013.01)

SELF-CAPACITIVE TOUCH PANEL STRUCTURE, IN-CELL TOUCH PANEL, AND LIQUID CRYSTAL DISPLAY

CROSS REFERENCE TO RELATED APPLICATIONS

This is a divisional application of co-pending patent application Ser. No. 14/759,268 filed on Jul. 6, 2015, which is a national stage of PCT Application Number PCT/CN2015/077483, filed on Apr. 27, 2015, claiming foreign priority of Chinese Patent Application Number 201510147757.8, filed on Mar. 31, 2015.

BACKGROUND OF THE INVENTION

1. Field of the Invention

The present invention relates to a touch display technology, and more particular to a self-capacitive touch panel structure, an in-cell touch panel, and a liquid crystal display.

2. Description of Related Art

A touch panel as an input medium is the most simple and convenient human-computer interaction method. Therefore, the touch panel is more widely applied to a variety of electronic products. Based on different operation principles and interfaces for transmitting information, touch panel products can divide into four types: an infrared touch panel, a capacitive touch panel, a resistive touch panel and a surface acoustic wave touch panel. The capacitive touch panel becomes the mainstream of touch panel technology because a long life, high transmittance, capable of supporting multiple touches, etc. The capacitive touch panel includes a surface capacitive type and a projected capacitive type. The projected capacitive type can be divided into a self-capacitive type and a mutual capacitive type. The self-capacitive touch panel structure, due to higher touch sensing accuracy and signal to noise ratio are favored by major panel manufacturers.

Currently, the self-capacitive touch panel structure utilizes a self-capacitance principle to detect a touch location of a finger. Specifically, multiple self-capacitance electrodes, which are disposed at a same layer and isolated with each other, are disposed in the touch panel structure. When a human body does not contact with the touch panel, a capacitance applied on each self-capacitance electrode is a fixed value. When a human body contact with the touch panel, a capacitance applied on a self-capacitance electrode, which is corresponding to a touch location, is the fixed value adding a human capacitance. A touch detection chip can determine the touch location in a touch time interval through detecting a capacitance change of each self-capacitance electrode.

FIG. 1 is a schematic diagram of a self-capacitive touch panel structure according to the conventional art. As shown in FIG. 1, the self-capacitive touch panel includes M rows and columns self-capacitance electrodes $R_{xy}$ ($R_{11}$-$R_{M1}$ to $R_{1N}$-$R_{MN}$), and a touch detection chip 1. Each self-capacitance electrode $R_{xy}$ utilizes a single connection line $L_{yx}$ to connect with the touch detection chip 1. Specifically, the self-capacitance electrodes $R_{xy}$ and the connection lines $L_{yx}$ are disposed at different layers, and each self-capacitance electrode $R_{xy}$ utilizes a via hole 2 to electrically connect with a corresponding connection line $L_{yx}$. That is, each column of the self-capacitance electrodes $R_{1y}$-$R_{My}$ is sequentially connected with a group of the connection lines $L_{y1}$-$L_{yM}$ in order.

As shown in FIG. 1, from a bottom side to a top side, the first column of the self-capacitance electrodes $R_{11}$-$R_{M1}$ respectively correspond to a group of the connection lines $L_{11}$-$L_{1M}$ which are from a left side to a right side. Each connection line $L_{1x}$ is connected with a corresponding self-capacitance electrode $R_{x1}$, and each connection line $L_{1x}$ is disconnected with other self-capacitance electrodes in order to realize an independent control of each self-capacitance electrode $R_{x1}$. That is, each self-capacitance electrode $R_{x1}$ connected with the connection line $L_{1x}$ is not connected with previous self-capacitance electrodes $R_{11}$-$R_{(x-1)1}$. After the connection line $L_{1x}$ is connected with the corresponding self-capacitance $R_{x1}$, the connection line $L_{1x}$ does not connect with following self-capacitance electrodes $R_{(x+1)1}$-$R_{M1}$.

Specifically, the first self-capacitance electrode $R_{11}$ of the self-capacitance electrodes $R_{11}$-$R_{M1}$ is connected with the touch detection chip 1 through the first connection line $L_{11}$ of the group of the connection lines $L_{11}$-$L_{1M}$; the second self-capacitance electrode $R_{21}$ of the self-capacitance electrodes $R_{11}$-$R_{M1}$ is connected with the touch detection chip 1 through the second connection line $L_{12}$ of the group of the connection lines $L_{11}$-$L_{1M}$, and so on; the Mth self-capacitance electrode $R_{M1}$ is connected with the touch detection chip 1 through the Mth connection line $L_{1M}$. In the above symbols, x=1, 2, 3, . . . , M; and y=1, 2, 3, . . . , N.

In the structure of the self-capacitive touch panel described above, each column of the self-capacitance electrodes $R_{1y}$-$R_{My}$ is sequentially connected with a group of the connection lines $L_{y1}$-$L_{yM}$ in order. For the same column of the self-capacitance electrodes $R_{1y}$-$R_{My}$, lengths of the group of the connection lines $L_{y1}$-$L_{yM}$ corresponding to the column are increased gradually. The self-capacitance electrode $R_{My}$ is farther away from the touch detection chip 1, and the corresponding connection line $L_{yM}$ is longer. Finally, for the display situation of entire structure of the touch panel, a slash display uneven phenomenon (slash mura) will generate at an end of the group of the connection lines $L_{y1}$-$L_{yM}$, as shown at an area "A" in FIG. 1, so as to affect the display quality.

SUMMARY OF THE INVENTION

In view of the deficiencies of the conventional art, the present invention provides a self-capacitive touch structure. Through improving the arrangement way of the connection lines of the self-capacitance electrodes, a slash mura problem of the conventional art is reduced so as to increase the display quality.

In order to achieve the above purpose, a technology solution adopted by the present invention is: a self-capacitive touch panel structure, comprising: a touch detection chip; and multiple self-capacitance electrodes arranged as a matrix and isolated with each other, each self-capacitance electrode connected with the touch detection chip through a connection line, each self-capacitance electrode electrically connected with a corresponding connection line through at least one via hole; wherein a group of connection lines connected with a same column of the multiple self-capacitance electrodes are divided into an odd number group and an even number group, the connection lines in the odd number group are sequentially connected with corresponding self-capacitance electrodes from a terminal of the same column of the self-capacitance electrodes, and the connection lines in the even number group are sequentially connected with corresponding self-capacitance electrodes from another terminal of the same column of the self-capacitance electrodes.

In the above solution, the self-capacitance electrodes and the connection lines are disposed at different layers.

In the above solution, a shape of each self-capacitance electrode is rectangular.

In the above solution, the at least one via hole includes 3 to 5 via holes.

In the above solution, the touch detection chip is located at a bottom side of the multiple self-capacitance electrodes, each column of the multiple self-capacitance electrodes includes a 1st to a Mth self-capacitance electrodes from a bottom to a top, a group of connection lines connected with the each column of the multiple self-capacitance electrodes includes a 1st to a Mth connection lines from a left to a right, wherein a 1st, a 3rd, a 5th, . . . connection lines are sequentially connected with a 1st, a 2nd, a 3rd, . . . self-capacitance electrodes; a 2nd, a 4th, a 6th, . . . connection lines are sequentially connected with a Mth, a (M−1)th, a (M−2)th, . . . self-capacitance electrodes.

In the above solution, the touch detection chip is located at a bottom side of the multiple self-capacitance electrodes, each column of the multiple self-capacitance electrodes includes a 1st to a Mth self-capacitance electrodes from a bottom to a top, a group of connection lines connected with the each column of the multiple self-capacitance electrodes includes a 1st to a Mth connection lines from a left to a right, wherein a 1st, a 3rd, a 5th, . . . connection lines are sequentially connected with a Mth, a (M−1)th, a (M−2)th, . . . self-capacitance electrodes; a 2nd, a 4th, a 6th, . . . connection lines are sequentially connected with a 1st, a 2nd, a 3rd, . . . self-capacitance electrodes.

In the above solution, materials of each self-capacitance electrode and each connection line are indium tin oxide (ITO).

Another embodiment of the present invention provides: an in-cell touch panel, comprising: an upper substrate; a lower substrate; a liquid crystal layer disposed between the upper substrate and the lower substrate; and a self-capacitive touch panel structure described above, wherein the self-capacitance electrodes and the connection lines are disposed on a side of the upper substrate facing toward the lower substrate.

Another embodiment of the present invention provides: a liquid crystal display includes a liquid crystal panel and a backlight module, wherein the liquid crystal panel is disposed oppositely to the backlight module, and the backlight module provides a display light source to the liquid crystal panel so that the liquid crystal panel can display am image. The liquid crystal panel adopts the in-cell touch panel described above.

In the self-capacitive touch panel structure provided by the embodiments of the present invention, for the group of the connection lines connected with the same column of the self-capacitance electrodes, an arrangement way of connection lines having shorter lengths and connection lines having longer lengths being disposed alternately is realized in order to effectively reduce the slash mura problem and increase the product display quality.

DETAILED DESCRIPTION OF THE PREFERRED EMBODIMENT

As described above, the purpose of the present invention is to improve the self-capacitive touch panel of the conventional art that lengths of a group of connection lines connected with a same column of the self-capacitance electrodes are increased gradually such that a slash mura problem is generated. Accordingly, a self-capacitive touch panel structure is disclosed. The self-capacitive touch panel structure comprises: a touch detection chip; and multiple self-capacitance electrodes arranged as a matrix and isolated with each other, each self-capacitance electrode connected with the touch detection chip through a connection line, each self-capacitance electrode electrically connected with a corresponding connection line through at least one via hole, wherein a group of connection lines connected with a same column of the multiple self-capacitance electrodes are divided into an odd number group and an even number group; the connection lines in the odd number group are sequentially connected with corresponding self-capacitance electrodes from a terminal of the same column of the self-capacitance electrodes; and the connection lines in the even number group are sequentially connected with corresponding self-capacitance electrodes from another terminal of the same column of the self-capacitance electrodes.

In the self-capacitive touch panel structure, through improving the arrangement way of the connection lines of the self-capacitance electrodes, a slash mura problem of the conventional art is reduced so as to increase the display quality.

The following content combines figures and embodiments for detail description of the present invention.

Embodiment 1

Figure 1:
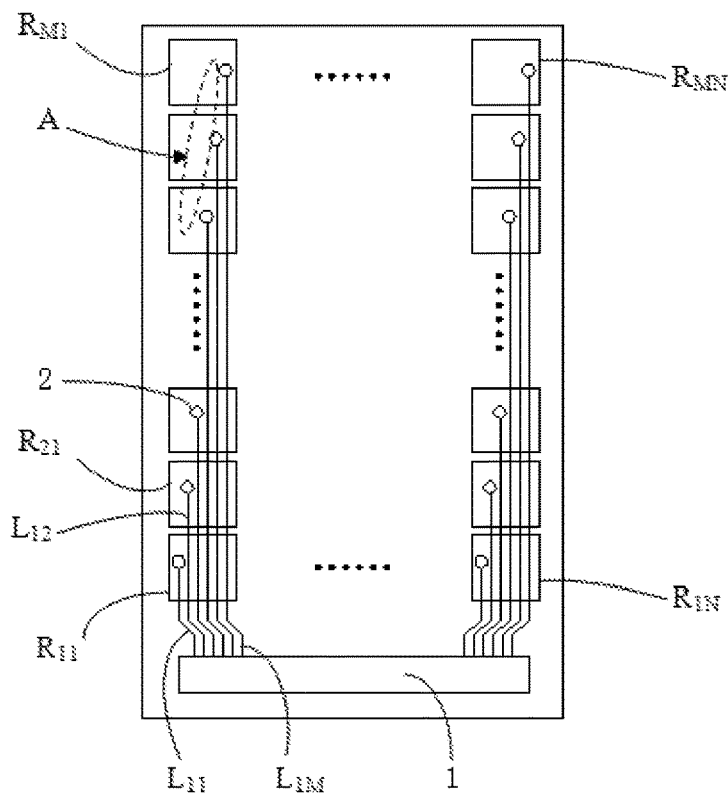
FIG. 1 is a schematic diagram of a self-capacitive touch panel structure according to the conventional art.
Figure 2:
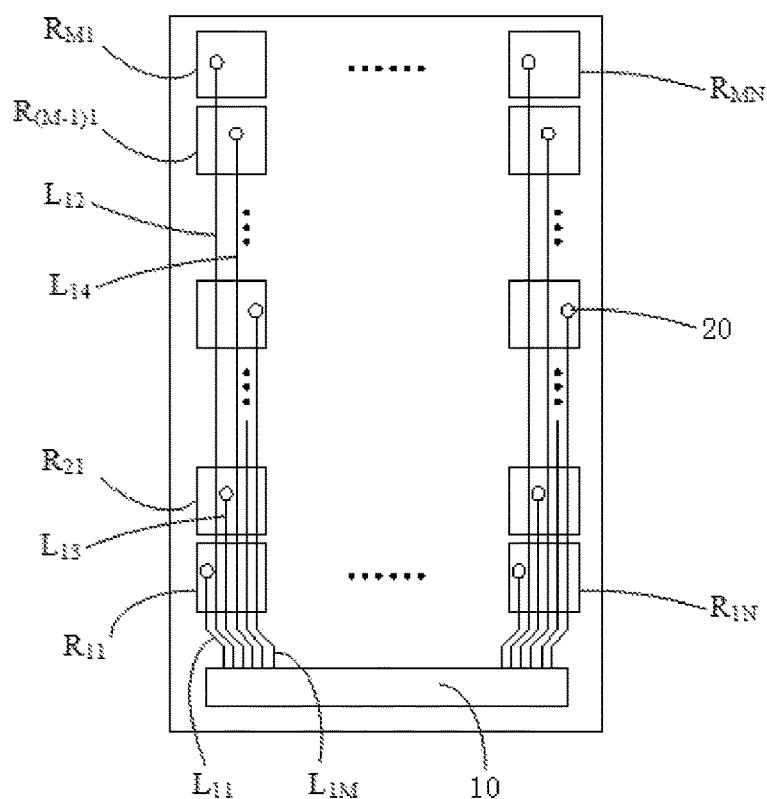
FIG. 2 is a schematic diagram of a self-capacitive touch panel structure according to a first embodiment of the present invention.

The present embodiment provides a self-capacitive touch panel structure. As shown in FIG. 2, the self-capacitive touch panel structure includes M rows and N columns self-capacitance electrodes Rxy ($R_{11}$-$R_{M1}$ to $R_{1N}$-$R_{MN}$), which are isolated with each other and a touch detection chip 10. Each self-capacitance electrode $R_{xy}$ is connected with the touch detection chip 10 through a single connection line $L_{yx}$. Specifically, in the present embodiment, a shape of each self-capacitance electrode $R_{x}y$ is rectangular. The self-capacitance electrode $R_{xy}$ and the connection line $L_{yx}$ are disposed at different layers. Materials of the self-capacitance electrode $R_{xy}$ and the connection line $L_{yx}$ are both indium tin oxide (ITO). The self-capacitance electrode $R_{xy}$ is electrically connected with a corresponding connection line $L_{yx}$ through at least one via hole 20. In the present the number of the at least one via hole is one. In another embodiment, in order to increase the electric connection performance between the self-capacitance electrode $R_{xy}$ and the corresponding connection line $L_{yx}$. The number of the at least one via hole maybe multiple, preferably, 3-5 via holes. In the above, x=1, 2, 3, . . . , M and y=1, 2, 3, . . . , N.

In the structure of the self-capacitive touch panel of the present embodiment, as shown in FIG. 2, the touch detection chip 10 is located at a bottom side of the multiple self-capacitance electrodes $R_{xy}$. Each column of the self-capacitance electrodes includes a 1st self-capacitance electrode to an Mth self-capacitance electrode $R_{1y}$-$R_{My}$ arranged from a bottom to a top. A group of connection lines connected with the column of the self-capacitance electrodes $R_{1y}$-$R_{My}$ includes a 1st to an Mth connection lines $L_{y1}$-$L_{yM}$ arranged from a left to a right. Connection lines $L_{yx}$ having shorter lengths and connection lines $L_{yx}$ having longer lengths are disposed alternately.

Specifically, using the first column of the self-capacitance electrodes $R_{11}$-$R_M$ as an example, the first column of the self-capacitance electrodes $R_{11}$-$R_{M1}$ is connected with the touch detection chip 10 through a first group of the connection lines $L_{11}$-$L_{1M}$. The first group of the connection lines $L_{11}$-$L_{1M}$ is divided into an odd number group and an even number group. The connection lines in the odd number group include odd-numbered connection lines $L_{11}$, $L_{13}$, ... and the even number group includes even-numbered connection lines $L_{12}$, $L_{14}$, ..., wherein the odd-numbered connection lines $L_{11}$, $L_{13}$, ... are sequentially connected with the self-capacitance electrodes $R_{11}$, $R_{21}$, ... from the bottom side of the column of the self-capacitance electrodes $R_{11}$-$R_{M1}$; and the even-numbered connection lines $L_{12}$, $L_{14}$, ... are sequentially connected with the self-capacitance electrodes $R_{M1}$, $R_{(M-1)1}$, ... from the top side of the self-capacitance electrodes $R_{11}$-$R_{M1}$. A last connection line $L_{1M}$ is connected with a self-capacitance electrode at a middle location of the column of the self-capacitance electrodes R $R_{11}$-$R_{M1}$.

Accordingly, for the group of the connection lines $L_{11}$-$L_{1M}$ connected with the same column of the self-capacitance electrodes $R_{11}$-$R_{M1}$, an arrangement way of connection lines having shorter lengths and connection lines having longer lengths being disposed alternately ($L_{11}$ and $L_{12}$; $L_{13}$ and $L_{14}$ are disposed alternately) is realized in order to effectively reduce the slash mura problem and increase the product display quality.

Embodiment 2

Figure 3:
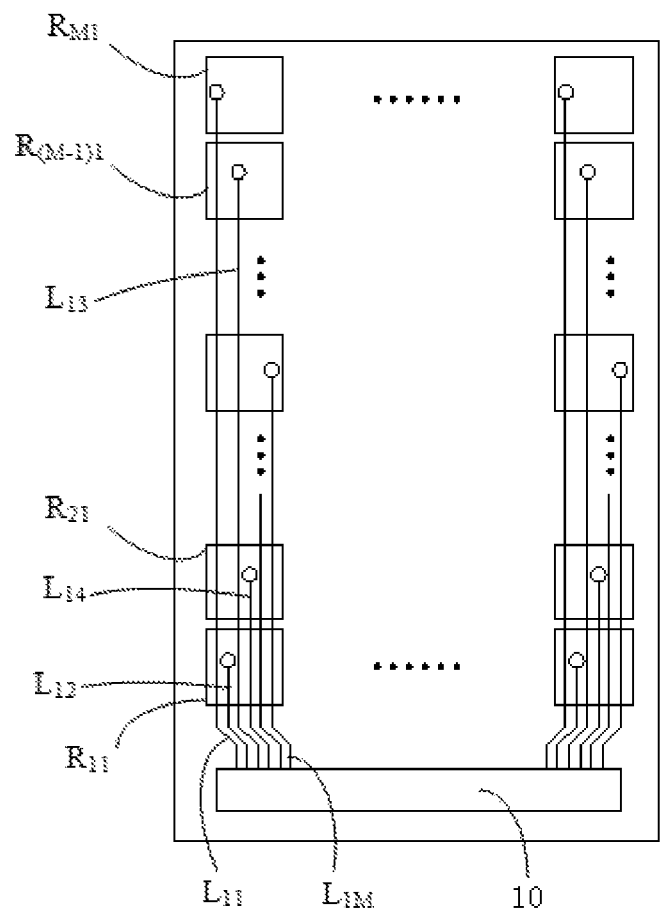
FIG. 3 is a schematic diagram of a self-capacitive touch panel structure according to a second embodiment of the present invention.

The difference between the present embodiment and the first embodiment is that a connection sequence of the odd-numbered connection lines and the even-numbered connection lines is right opposite to a connection sequence of the odd-numbered connection lines and the even-numbered connection lines in the embodiment 1. As shown in FIG. 3, using the first column of the self-capacitance electrodes $R_{11}$-$R_{M1}$ as an example, the first column of the self-capacitance electrodes $R_{11}$-$R_{M1}$ is connected with the touch detection chip 10 through a first group of the connection lines $L_{11}$-$L_{1M}$. The first group of the connection lines $L_{11}$-$L_{1M}$ are divided into an odd number group and an even number group. The connection lines in the odd number group include odd-numbered connection lines $L_{11}$, $L_{13}$, ..., and the even number group includes even-numbered connection lines $L_{12}$, $L_{14}$, ....

The odd-numbered connection lines $L_{11}$, $L_{13}$, ... are sequentially connected with the self-capacitance electrodes $R_{11}$, $R_{M1}$, ... from the top side of the self-capacitance electrodes $R_{M1}$, $R_{(M-1)1}$, .... The even-numbered connection lines $L_{12}$, $L_{14}$, ... are sequentially connected with the self-capacitance electrodes $R_{11}$, $R_{M1}$, ... from the bottom side of the self-capacitance electrodes $R_{11}$-$R_{M1}$. A last connection line $L_{1M}$ is connected with a self-capacitance electrode at a middle location of the column of the self-capacitance electrodes $R_{11}$-$R_{M1}$. Accordingly, for the group of the connection lines $L_{11}$-$L_{1M}$ connected with the same column of the self-capacitance electrodes $R_{11}$-$R_{M1}$. An arrangement way of connection lines having shorter lengths and connection lines having longer lengths being disposed alternately ($L_{11}$ and $L_{12}$; $L_{13}$ and $L_{14}$ are disposed alternately) is realized in order to effectively reduce the slash mura problem and increase the product display quality.

Embodiment 3

Figure 4:
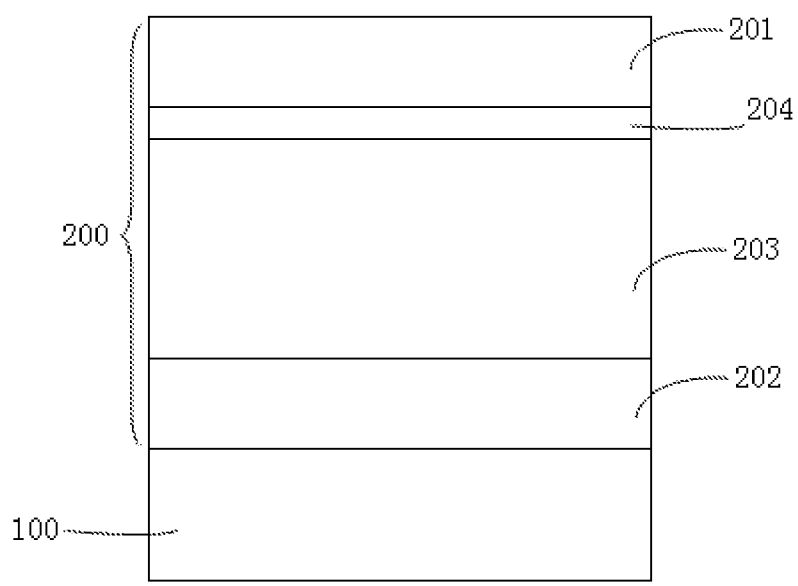
FIG. 4 is a schematic diagram of an in-cell touch panel and a liquid crystal display according to a third embodiment of the present invention.

As shown in FIG. 4, the present embodiment provides an in-cell touch panel 200. The touch panel includes an upper substrate 201, a lower substrate 202 and a liquid crystal layer 203 disposed between the upper substrate 201 and the lower substrate 202. Furthermore, the in-cell touch panel 200 also includes the self-capacitive touch panel 204 provided in Embodiment 1 or Embodiment 2. The self-capacitance electrodes and the connection lines in the self-capacitive touch panel 204 are all disposed on a side of the upper substrate 201 facing toward the lower substrate 202.

As shown in FIG. 4, the present embodiment also provides a liquid crystal display. The liquid crystal display includes the in-cell touch panel 200 and a backlight module 100. The in-cell touch panel 200 and the backlight module 100 are disposed oppositely. The backlight module 100 provides display light to the in-cell touch panel 200 so that the in-cell touch panel 200 can display an image.

In summary, the self-capacitive touch panel structure provided by the embodiments of the present invention, for the group of the connection lines connected with the same column of the self-capacitance electrodes, an arrangement way of connection lines having shorter lengths and connection lines having longer lengths being disposed alternately is realized in order to effectively reduce the slash mura problem and increase the product display quality.

It should be noted that, herein, relational terms such as first and second, and the like are only used to distinguish one entity or operation from another entity or operation. It is not required or implied that these entities or operations exist any such relationship or order between them. Moreover, the terms "comprise," "include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one, ... " element defined does not exclude the existence of additional identical elements in the process, method, article, or apparatus.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A self-capacitive touch panel structure, comprising: a touch detection chip; and multiple self-capacitance electrodes arranged as a matrix and isolated with each other, each self-capacitance electrode connected with the touch detection chip through a connection line, each self-capacitance electrode electrically connected with a corresponding connection line through at least one via hole;

wherein a group of connection lines connected with a same column of the multiple self-capacitance electrodes are divided into an odd number group and an even number group; the connection lines in the odd number group are sequentially connected with a terminal of a corresponding self-capacitance electrode of the same column of the self-capacitance electrodes;

and the connection lines in the even number group are sequentially connected with a terminal of a corresponding self-capacitance electrode of the same column of the self-capacitance electrodes; and wherein the touch detection chip is located at a bottom side of the multiple self-capacitance electrodes; each column of the multiple self-capacitance electrodes includes a 1st to a Mth self-capacitance electrodes from a bottom to a top; a group of connection lines connected with the each column of the multiple self-capacitance electrodes includes a 1st to a Mth connection lines from a left to a right, wherein a 1st, a 3rd, a 5th, . . . connection lines are sequentially connected with a Mth, a (M−1)th, a (M−2)th, . . . self-capacitance electrodes and a 2nd, a 4th, a 6th, . . . connection lines are sequentially connected with a 1st, a 2nd, a 3rd, . . . self-capacitance electrodes.

2. The self-capacitive touch panel according to claim 1, wherein the self-capacitance electrodes and the connection lines are disposed at different layers.

3. The self-capacitive touch panel according to claim 1, wherein a shape of each self-capacitance electrode is rectangular.

4. The self-capacitive touch panel according to claim 1, wherein the at least one via hole includes 3 to 5 via holes.

5. The self-capacitive touch panel according to claim 1, wherein materials of each self-capacitance electrode and each connection line are indium tin oxide (ITO).

6. An in-cell touch panel, comprising:
an upper substrate;
a lower substrate;
a liquid crystal layer disposed between the upper substrate and the lower substrate; and
a self-capacitive touch panel structure, including:
a touch detection chip; and
multiple self-capacitance electrodes arranged as a matrix and isolated with each other, each self-capacitance electrode connected with the touch detection chip through a connection line, each self-capacitance electrode electrically connected with a corresponding connection line through at least one via hole;

wherein a group of connection lines connected with a same column of the multiple self-capacitance electrodes are divided into an odd number group and an even number group; the connection lines in the odd number group are sequentially connected with a terminal of a corresponding self-capacitance electrode of the same column of the self-capacitance electrodes; and the connection lines in the even number group are sequentially connected with a terminal of a corresponding self-capacitance electrode of the same column of the self-capacitance electrodes;

wherein the touch detection chip is located at a bottom side of the multiple self-capacitance electrodes, each column of the multiple self-capacitance electrodes includes a 1st to a Mth self-capacitance electrodes from a bottom to a top, a group of connection lines connected with the each column of the multiple self-capacitance electrodes includes a 1st to a Mth connection lines from a left to a right, wherein a 1st, a 3rd, a 5th, . . . connection lines are sequentially connected with a Mth, a (M−1)th, a (M−2)th, . . . self-capacitance electrodes; a 2nd, a 4th, a 6th, . . . connection lines are sequentially connected with a 1st, a 2nd, a 3rd, . . . self-capacitance electrodes; and wherein the self-capacitance electrodes and the connection lines are disposed on a side of the upper substrate facing toward the lower substrate.

7. The in-cell touch panel according to claim 6, wherein the self-capacitance electrodes and the connection lines are disposed at different layers.

8. The in-cell touch panel according to claim 6, wherein a shape of each self-capacitance electrode is rectangular.

9. The in-cell touch panel according to claim 8, wherein the at least one via hole includes 3 to 5 via holes.

10. The in-cell touch panel according to claim 8, wherein materials of each self-capacitance electrode and each connection line are indium tin oxide (ITO).

11. A liquid crystal display, comprising:
a liquid crystal panel, including:
an upper substrate;
a lower substrate;
a liquid crystal layer disposed between the upper substrate and the lower substrate; and
a self-capacitive touch panel structure, including:
a touch detection chip; and
multiple self-capacitance electrodes arranged as a matrix and isolated with each other, each self-capacitance electrode connected with the touch detection chip through a connection line, each self-capacitance electrode electrically connected with a corresponding connection line through at least one via hole;

wherein a group of connection lines connected with a same column of the multiple self-capacitance electrodes are divided into an odd number group and an even number group; the connection lines in the odd number group are sequentially connected with a terminal of a corresponding self-capacitance electrode of the same column of the self-capacitance electrodes; and the connection lines in the even number group are sequentially connected with a terminal of a corresponding self-capacitance electrode of the same column of the self-capacitance electrodes;

wherein the touch detection chip is located at a bottom side of the multiple self-capacitance electrodes, each column of the multiple self-capacitance electrodes includes a 1st to a Mth self-capacitance electrodes from a bottom to a top, a group of connection lines connected with the each column of the multiple self-capacitance electrodes includes a 1st to a Mth connection lines from a left to a right, wherein a 1st, a 3rd, a 5th, . . . connection lines are sequentially connected with a Mth, a (M−1)th, a (M−2)th, . . . self-capacitance electrodes; a 2nd, a 4th, a 6th, . . . connection lines are sequentially connected with a 1st, a 2nd, a 3rd, . . . self-capacitance electrodes; and wherein the self-capacitance electrodes and the connection lines are disposed on a side of the upper substrate facing toward the lower substrate; and a backlight module disposed oppositely to the liquid crystal panel, and providing display light source to the liquid crystal panel such that the liquid crystal panel can display an image.

12. The liquid crystal display according to claim 11, wherein the self-capacitance electrodes and the connection lines are disposed at different layers.

13. The liquid crystal display according to claim 11, wherein a shape of each self-capacitance electrode is rectangular.

14. The liquid crystal display according to claim 11, wherein the at least one via hole includes 3 to 5 via holes.

15. The liquid crystal display according to claim 11, wherein materials of each self-capacitance electrode and each connection line are indium tin oxide (ITO).

\* \* \* \* \*